(12) United States Patent
Marchisio et al.

(10) Patent No.: US 9,077,727 B2
(45) Date of Patent: Jul. 7, 2015

(54) METHOD AND SYSTEM FOR DATA MANAGEMENT IN PEER-TO-PEER NETWORK

(75) Inventors: Marco Enzo Marchisio, Turin (IT); Ivan Pazzini, Turin (IT); Simone Ruffino, Turin (IT); Roberto Baldoni, Toma (IT); Alessia Milani, Rome (IT); Leonardo Querzoni, Rome (IT)

(73) Assignee: Telecom Italia S.p.A., Milan (IT)

( * ) Notice: Subject to any disclaimer, the term of this patent is extended or adjusted under 35 U.S.C. 154(b) by 1042 days.

(21) Appl. No.: 13/143,053

(22) PCT Filed: Dec. 30, 2008

(86) PCT No.: PCT/EP2008/011143
§ 371 (c)(1),
(2), (4) Date: Jun. 30, 2011

(87) PCT Pub. No.: WO2010/075868
PCT Pub. Date: Jul. 8, 2010

(65) Prior Publication Data
US 2011/0276633 A1    Nov. 10, 2011

(51) Int. Cl.
*G06F 15/16*    (2006.01)
*G06F 15/173*    (2006.01)
*H04L 29/08*    (2006.01)

(52) U.S. Cl.
CPC .......... *H04L 67/104* (2013.01); *H04L 67/1095* (2013.01)

(58) Field of Classification Search
CPC .......................... H04L 67/104; H04L 67/1095
USPC ......... 709/201, 205, 218, 224, 225, 226, 227, 709/230, 238
See application file for complete search history.

(56) References Cited

U.S. PATENT DOCUMENTS

| | | | |
|---|---|---|---|
| 7,065,579 B2 * | 6/2006 | Traversat et al. | 709/225 |
| 7,197,565 B2 * | 3/2007 | Abdelaziz et al. | 709/224 |
| 7,340,500 B2 * | 3/2008 | Traversat et al. | 709/227 |
| 7,783,777 B1 * | 8/2010 | Pabla et al. | 709/238 |
| 8,843,637 B2 * | 9/2014 | Dietrich et al. | 709/226 |

FOREIGN PATENT DOCUMENTS

WO     01/82678 A2    11/2001

OTHER PUBLICATIONS

Written Opinion and International Search Report mailed Oct. 9, 2009, PCT/EP2008/011143.
(Continued)

*Primary Examiner* — Quang N Nguyen
(74) *Attorney, Agent, or Firm* — Banner & Witcoff, Ltd.

(57) ABSTRACT

A method for managing storage of data objects in a peer-to-peer system including a plurality of peer entities is provided. For each data object to be stored into the peer-to-peer system, the method including establishing a group of peer entities so that the group meets a stability requirement according to predetermined stability rules, storing the data object into each peer entity of the group, and each peer entity of the group generating and maintaining a group list associated with the data object, which includes the peer entities of the group.

13 Claims, 12 Drawing Sheets

(56) References Cited

OTHER PUBLICATIONS

Chandy J A: "Storage-Allocation in 1-16, Unreliable Peer-to-Peer Systems",Dependable Systems and Networks, 2006. DSN 2006. International Confere Nce on Philadelphia, PA, USA Jun. 25-28, 2006, Piscataway, NJ, USA, IEEE, Jun. 25, 2006, pp. 227-236, XP010925239.

Wang et al: "An efficient update propagation algorithm for P2P systems", Computer Communications, Elsevier Science Publishers BV, Amsterdam, NL, vol. 30, No. 5, Feb. 20, 2007, pp. 1106-1115, XP005895789.

Datta A et al: "Updates in highly unreliable,replicated peer-to-peer systems", Proceedings of the 23rd. International Conference on Distributed Computing Systems. ICDCS 2003. Providence, RI, May 19-22, 2003; [International Conference on Distributed Computing Systems], Los Alamitos, CA : IEEE Comp. Soc, US, vol. Conf. 23, May 19, 2003, pp. 76-85, XP010642275.

Pamies-Juarez L et al: "Rewarding stability in peer-to-peer backup systems", Networks, 2008. ICON 2008. 16th IEEE International Conference On, IEEE, Piscataway, NJ, USA, Dec. 12, 2008, pp. 1-6, XP031417469.

Ranganathan K et al: "Improving Data Availability through Dynamic Model-Driven Replication in Large Peer-to-Peer Communities", Cluster Computing and the Grid 2nd IEEE/ACM International Symposium CC GRID2002 Berlin, Germany May 21-24, 2002, Piscataway, NJ, USA, IEEE Comput. Soc, US, May 21, 2002, pp. 376-376, XP010853464.

R. Bhagwan et al. "Replication Strategies for Highly Available Peer-to-Peer Storage", Jun. 2002, 3 pages.

F.M. Cuenca-Acuna et al. "Autonomous Replication for High Availability in Unstructured P2P Systems", 22nd IEEE International Symposium on Reliable Distributed Systems, 2003 (SRDS'03), 11 pages.

S.Voulgaris et al. "Cyclon: Inexpensive Membership Management for Unstructured P2P Overlays", J. Network and Systems Management, 13(2), Jun. 2005, pp. 197-217.

\* cited by examiner

| Profile Data Structure | |
|---|---|
| ID of Data Object$_i$ | $IP_A, \ldots, IP_X$ |
| ... | |
| ID of Data Object$_j$ | $IP_B, \ldots, IP_Y$ |

Fig. 4a

| Stored Object Data Structure | |
|---|---|
| ID of Data Object$_i$ | Data Object$_i$ |
| ... | |
| ID of Data Object$_j$ | Data Object$_j$ |

Fig. 4b

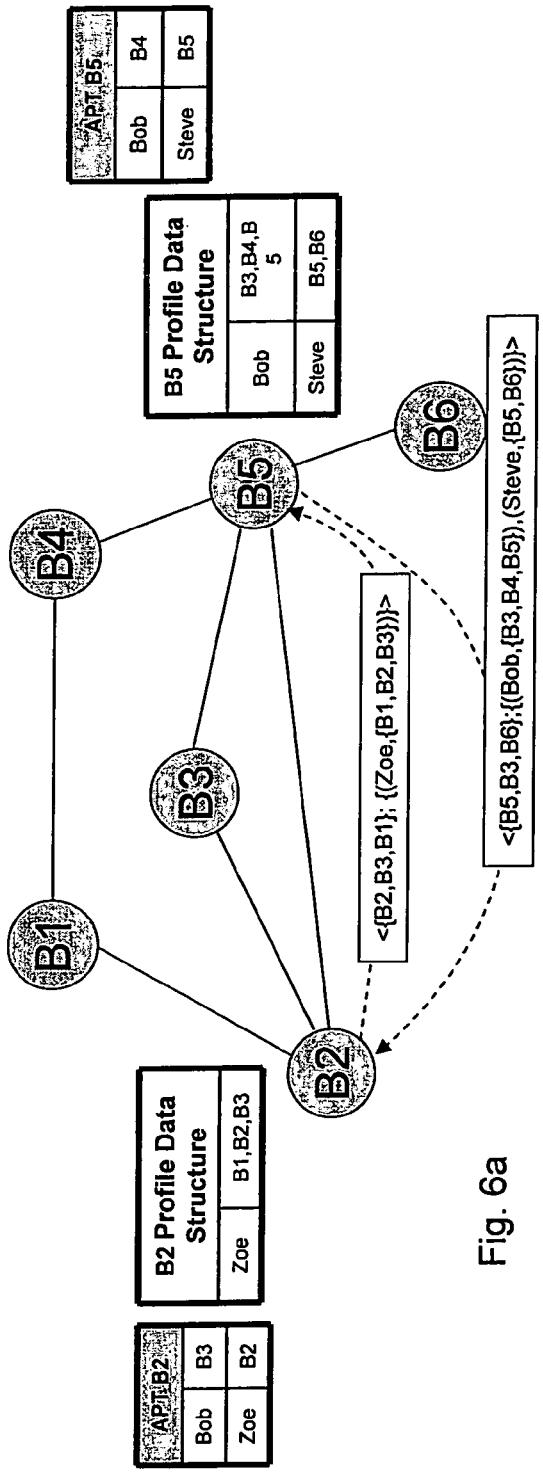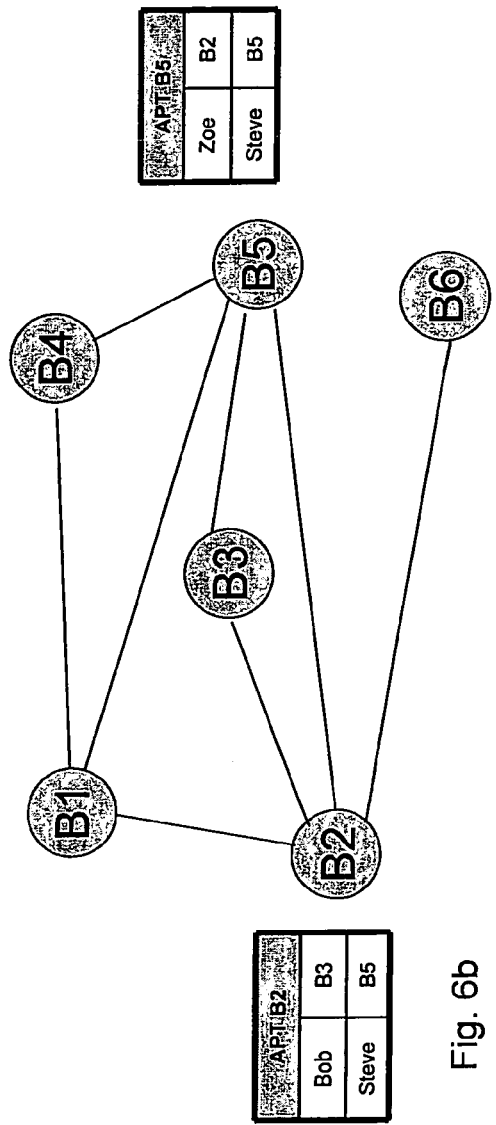
Fig. 6a
Fig. 6b

<Subset of neighbours; {(ID of data object$_i$, list of peer entities storing data object$_i$),.... (ID of data object$_j$, list of peer entities storing data object$_j$)}>

Fig. 8

| Access Point Table (APT) | |
|---|---|
| ID of Data Object$_i$ | Identifier of a peer entity storing Data Object$_i$ |
| ... | ... |
| ID of Data Object$_j$ | Identifier of a peer entity storing Data Object$_j$ |

Fig. 9

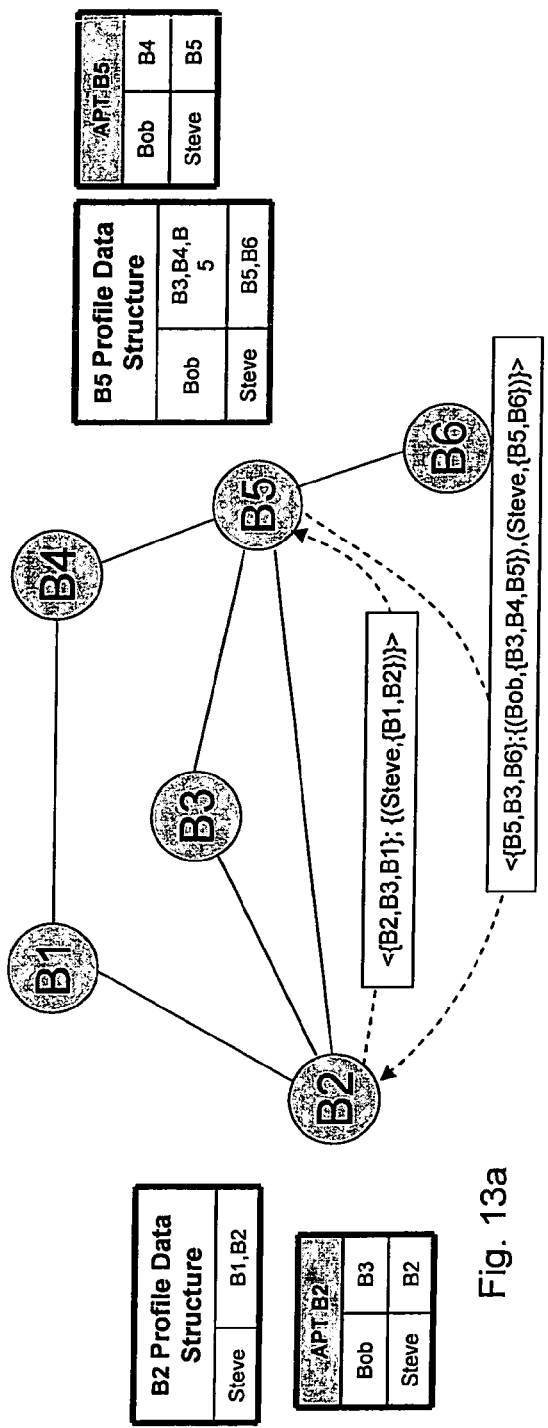
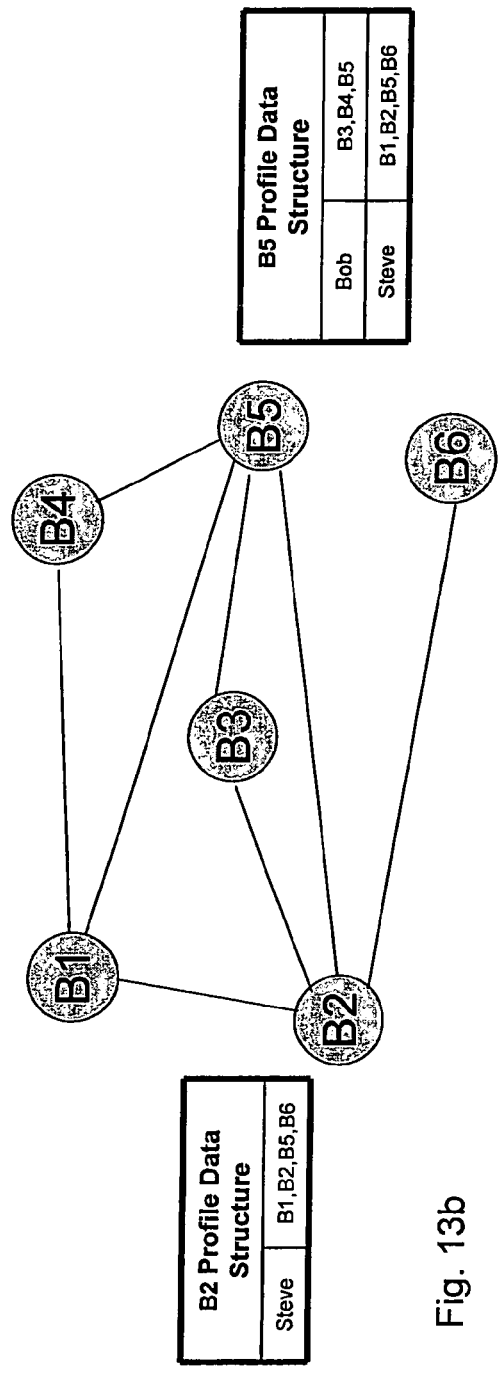
Fig. 13a
Fig. 13b

METHOD AND SYSTEM FOR DATA MANAGEMENT IN PEER-TO-PEER NETWORK

CROSS REFERENCE TO RELATED APPLICATIONS

This is a U.S. National Phase Application under 35 U.S.C. §371 of International Application No. PCT/EP2008/011143, filed Dec. 30, 2008, which was published Under PCT Article 21(2), the entire contents of which are incorporated herein by reference.

The present invention relates to data management in peer-to-peer networks.

As stated by R. Bhagwan et al. ("Replication Strategies for Highly Available Peer-to-Peer Storage" In Proceedings of FuDiCo: Future directions in Distributed Computing, June 2002), in the past few years, peer-to-peer networks have become an extremely popular mechanism for large scale content sharing. Unlike traditional client-server applications, which centralize the management of data in a few highly reliable servers, peer-to-peer systems distribute the burden of data storage, computation, communications and administration among thousands of individual client workstations. The challenge in providing high availability to peer-to-peer systems is now being studied. Indeed, individually administered workstations of a peer-to-peer system may be turned on and off, join and leave the system, have intermittent connectivity, and may be constructed from low-cost-reliability components. As a result, it is important to have some form of redundancy to preserve data availability.

John A. Chandy ("Storage Allocation in Unreliable Peer-to-Peer Systems", In proceedings of 2006 International Conference on Dependable Systems and Networks (DSN), Philadelphia, USA, 2006) proposes a storage allocation strategy concentrating on a node that is publishing an object and must decide where to place the objects fragments to maximize object availability with the constraint that each node has limited storage. The strategy uses m/n erasure codes where an object is split into n fragments and distributed to n peers, but only m fragments are required to recover the data. Moreover, it presumes that each node keeps track of the availability of K other nodes in the system. These K nodes provide a set of nodes from which we can select n nodes to use for redundancy, and these n nodes should be chosen such that object availability is maximized. The Applicant notes that according to this strategy, once replicas are allocated, there is not any replica maintenance strategy to handle system dynamism. Thus the object is not guaranteed to be persistent with respect to node removals.

F. M. Cuenca-Acuna et al. ("Autonomous Replication for High Availability in Unstructured P2P Systems", In Proceedings of the 22nd IEEE International Symposium on Reliable Distributed Systems (SRDS'03)), disclose a publish/subscribe system (PlanetP system) that supports content-based search, rank, and retrieval across a peer-to-peer community. In PlanetP system, a replication algorithm provides that each member periodically selects a file from a hoard set of files locally stored therein and attempts to increase its availability generating an additional random erasure coded fragment of the file and pushing it to another peer (target). The target accepts and saves the incoming fragment if there is sufficient free space in its replication store. If there is insufficient space, it either rejects the replication request or ejects enough fragments to accept the new fragment. Victims are chosen using a weighted random selection process, where more highly available fragments are more likely to be chosen. The goal is to increase the availability of shared files toward a common target availability.

The Applicant notes that according to this strategy, members storing complete files or code fragments are not evaluated on their singular probability of remaining stably in the system, but rather on the basis of a global average availability parameter.

The Applicant faced the problem of providing a peer-to-peer system, which guarantees high performances and reliability in data storage and retrieval.

Accordingly, in a first aspect the present invention relates to a method for managing storage of data objects in a peer-to-peer system comprising a plurality of peer entities, wherein, for each data object to be stored into the peer-to-peer system:

a) a group of peer entities is formed so that the group meets a stability requirement according to predetermined stability rules, b) the data object is stored into each peer entity of the group, characterized in that:

c) each peer entity of the group generates and holds a group list, associated with the data object, of the peer entities of the group.

According to the method of the invention, each data object is stored into the peer-to-peer system in a group of peer entities that meets a predetermined stability requirement and each peer entity of the group holds a group list with the peer entities that store such data object. Each peer entity is thus kept informed on the peer entities that store a same data as itself. This advantageously enables the peer entities of the group to keep the stability of the group monitored over the time and, when the stability requirement is not met anymore due to the dynamism of the peer-to-peer system, to change the composition of the group so as to restore the stability requirement.

Therefore, once a data object is stored into the peer-to-peer system, persistent and robust storage can be ensured despite the dynamism of the peer-to-peer system, wherein peer entities can enter and depart in an unpredictable way.

The method of the invention also enables to improve the efficiency of a data object update procedure in that, as soon as a request for updating a data object reaches a peer entity that locally stores the data object, the latter—thanks to the group list it holds—is enabled to spread the request all over the other peer entities of the group that store such data object. Data objects can thus be kept consistent over concurrent accesses and updates.

The dependent claims set out particular embodiments of the invention.

According to a preferred embodiment, the peer-to-peer system is an unstructured peer-to-peer system. The unstructured peer-to-peer system preferably supports a uniform sampling mechanism.

However, the invention may also be applied to a structured peer-to-peer system that supports a uniform sampling mechanism.

Advantageously, steps a) and b) are carried out by a peer entity of the peer-to-peer system, which desires to store the data object into the peer-to-peer system. Steps a) and b) can be carried out by a peer entity of the peer-to-peer system that locally stores the data object.

Advantageously, according to the method of the invention, it is periodically checked if, according to said predetermined stability rules, the stability requirement of the group formed in step a) is kept over the time. In the negative case, the composition of the group is advantageously changed by adding or removing peer entities so as to move back the group to meet the stability requirement. Advantageously, at each change of the composition of the group, all the peer entities of the group are informed so that they can update their group list.

According to a preferred embodiment of the invention, the peer entities of the group, which has been formed in step a), elect a primary peer entity of the group, according to a common selection criterion, which is intended for keeping the stability requirement of the group over the time. In this embodiment, the elected primary peer entity advantageously periodically checks if, according to said predetermined stability rules, the stability requirement of the group is kept. In the negative case, the primary peer entity advantageously changes the composition of the group by adding or removing peer entities so as to move back the group to meet the stability requirement. Advantageously, at each change of the composition of the group, the primary peer entity updates its group list. Advantageously, at each change of the composition of the group, the primary peer entity informs all the peer entities of the group so that they can update their group list associated with the data object.

Advantageously, the common selection criterion provides that a peer entity of the group, which has a high permanency time in the peer-to-peer system, is selected. Preferably, the common selection criterion provides that a peer entity, which has the highest permanency time in the peer-to-peer system, among the peer entities of the group, is selected.

Advantageously, the stability requirement is checked on the basis of a permanency time in the peer-to-peer system (session time), which is associated with each peer entity of the group. Advantageously, each peer entity of the group sends (periodically or by request) to the primary peer entity of the group a message containing its current session time.

Preferably, the stability requirement is checked by using the following stability function f(G):

$$f(G) = \sum_{i=1}^{|N_G|} f_i \text{ where } f_i = \begin{cases} w_s/h & \text{if } S_i < S_{short} \\ w_m/h & \text{if } S_{short} \leq S_i \leq S_{long} \\ w_l/h & \text{if } S_i \geq S_{long} \end{cases}$$

wherein $N_G$ is the number of peer entities belonging to the group; $S_i$ represents the current session time (expressed in hours) of the i-th peer entity of the group; $S_{short}$ and $S_{long}$, with $S_{short} < S_{long}$, are expressed in hours and represent two session time values (a typically short session time value and a typically long session time value); h represents a minimum number of peer entities with session time shorter than $S_{short}$, which are necessary to emulate a failure free server; $w_s/h$ represents the weight of a peer entity having session time $S_i < S_{short}$; $w_m/h$ represents the weight of a peer entity having session time $S_i$, wherein $S_{short} \leq S_i < S_{long}$; and $w_l/h$ represents the weight of a peer entity having session time $S_i \geq S_{long}$, wherein $w_s = 1$ and $w_s < w_m < w_l$.

Advantageously, the stability requirement is kept over the time by the primary peer entity also on the basis of information that is indicative of presence/departure of the peer entities of the group in/from the peer-to-peer system.

Advantageously, the peer entities of the group periodically send to the primary peer entity a heartbeat message, which is indicative of their presence in the peer-to-peer system.

Advantageously, when the primary peer entity does not receive an expected heartbeat message from a peer entity of the group, it removes it from its group list. Advantageously, the primary peer entity also informs all the peer entities of the group so that they can update their group list associated with the data object.

Advantageously, the primary peer entity of the group periodically sends to the other peer entities of the group a heartbeat message, which is indicative of its presence in the peer-to-peer system.

Advantageously, when the peer entities of the group do not receive an expected heartbeat message from the primary peer entity, they remove it from their group list. In addition, they advantageously elect, according to said common selection criterion, a new primary peer entity, among the peer entities of the group.

Typically, each peer entity of the peer-to-peer system holds a neighbour list comprising a number of peer entities of the peer-to-peer system.

Preferably, each peer entity of the peer-to-peer system holds an access point table (APT) comprising a list of data objects stored into the peer-to-peer system, wherein each data object is associated with a peer entity of the peer-to-peer system that stores the data object. Thanks to this feature, when a peer entity receiving a request for a data object retrieval or a data object update does not locally store the data object itself, it can check if its APT comprises information on a peer entity storing said data object and, in the affirmative, it can forward the request to said peer entity instead of sending the request to a randomly chosen peer entity. Therefore, the probability of succeeding in retrieving/updating a data object in the peer-to-peer system of the invention is enhanced.

Advantageously, each peer entity of the peer-to-peer system, which stores at least one data object and holds a corresponding group list comprising the peer entities that store the data object itself, periodically exchanges information about the at least one stored data object and the corresponding group list with another peer entity of the peer-to-peer system. Advantageously, each peer entity of the peer-to-peer system, which stores a plurality of data objects and holds a corresponding plurality of group lists, periodically exchanges information about the stored data objects and the corresponding plurality of group lists with another peer entity of the peer-to-peer system. Said another peer entity is advantageously randomly selected from the neighbour list of the peer entity. This advantageously allows for uniform distribution over the peer-to-peer system of information on the data objects stored in the peer-to-peer system and on the composition of the groups of peer entities that store said data objects.

Advantageously, at each exchange of information with said another peer entity, each peer entity updates its APT table by substituting a pair data object/associated peer entity, as stored therein, with another pair data object/associated peer entity, by using the information received at the exchange of information with said another peer entity. This advantageously allows for the uniform distribution of information on peer entities that store data objects in the peer-to-peer system among the APTs locally managed by each peer entity of the peer-to-peer system.

Typically, at each exchange of information, each peer entity also exchange information, with said another peer entity, on at least one peer entity selected from the neighbour list held by the peer entity itself. Said at least one peer entity can be chosen from said neighbour list randomly or according to a predefined criterion.

Advantageously, when, at one of said periodic exchanges of information, the peer entity realizes that the another peer entity stores a same data object as the peer entity but that the group list associated with said data object by the other peer entity is different from the group list associated with the data object by the peer entity itself, then the peer entity executes a recovery procedure adapted to modify its group list so as to include all the peer entities belonging to the two different group lists.

As also described in more detail below, this recovery procedure is advantageous in order to restore a group of peer entities that in the peer-to-peer system store a same data object and that, for any reasons, have split in two (or more) groups.

Advantageously, according to said recovery procedure, the peer entity also sends information about the modified group list to the peer entities belonging to the modified group list so that they can modify their group list associated with the relevant data object.

Advantageously, according to said recovery procedure, when the peer entities of the modified group list have modified their group lists, they advantageously elect a new common primary peer entity according to the said common selection criterion. Then, in the same way as already disclosed above, the new primary peer entity will keep the stability requirement of the group over the time.

Advantageously, when one of the plurality of peer entities of the peer-to-peer system receives by a requesting entity (e.g., a user or another peer entity) a request to retrieve a data object from the peer-to-peer system, it checks if it locally stores the data object and, in the positive case, it provides the requesting entity with the data object. In the negative case, it accesses its APT table to check if there is information on a peer entity that stores the requested data object and, in the positive case, the peer entity advantageously sends the request for the data object to the peer entity found in its APT table. In the negative case, it sends the request for the data object to a peer entity chosen (typically in a random way) from its neighbour list. Advantageously, the request is sent to the peer entity chosen from the neighbour list if a predetermined TTL (Time To Live) has not expired yet. If the TTL has expired the procedure ends.

Advantageously, in order to guarantee a given fixed probability of retrieving data objects in the peer-to-peer system, despite the TTL and the fact that the size of the peer-to-peer system (in terms of number of peer entities and number of data object stored in the system) can continuously expand due to the system dynamism, each peer entity is advantageously adapted to adapt over the time the size of its APT, on the basis of an analysis of the content of its APT and, in particular, of an estimate of the overall number of data objects stored in the peer-to-peer system by looking at the variability of the data objects contained in its APT table. The probability of retrieving a data object is thus kept constant and independent from both size and dynamism of the system.

Advantageously, when one of the plurality of peer entities of the peer-to-peer system receives by a requesting entity (e.g., a user or another peer entity) a request to update a data object, it checks if it locally stores the data object and, in the positive case, it updates the data object locally stored therein and forwards the request for the update to the peer entities comprised in its group list, which is associated with the data object itself. The data object is advantageously updated only if necessary (that is, if the data object has not already been updated). In the negative case, the peer entity accesses its APT to check if there is information on a peer entity that stores the data object and, in the positive case, it advantageously sends the request for the update to the peer entity found in its APT. In the negative case, the peer entity sends the request to a peer entity chosen (typically in a random way) from its neighbour list. Advantageously, the request is sent to the peer entity chosen from the neighbour list if a predetermined TTL (Time To Live) has not expired yet. If the TTL has expired the procedure ends.

In a second aspect the present invention relates to a peer-to-peer system comprising a plurality of peer entities wherein each peer entity comprises modules that are adapted, at the receipt of a request for storing a data object into the peer-to-peer system, to:
  form a group of peer entities of the peer-to-peer system so that the group meets a stability requirement according to predetermined stability rules, and
  send instructions to each peer entity of the group to store the data object,
  characterized in that:
  said instructions comprise information on the peer entities forming the group, and in that
  each peer entity of the peer-to-peer system also comprises modules that, at the receipt of said instructions, are adapted to store the data object and to generate and hold a group list, associated with said data object, with the peer entities comprised in the received instructions.

The dependent claims set out particular embodiments of the invention.

The modules may be hardware modules, software modules, firmware modules or any combination thereof.

The request for storing a data object can be made by any requesting entity. The requesting entity may be a user of the peer entity or any device adapted to make the request.

Once stored a data object, the modules of each peer entity are advantageously adapted to elect a primary peer entity, among the peer entities of the group list associated with said data object, according to a common selection criterion.

The modules of each peer entity are advantageously such that, when the peer entity is elected as primary peer entity of a group associated with a data object, they are adapted to periodically check if the stability requirement of the group is kept according to the predetermined stability rules. In the negative case, the modules are advantageously adapted to change the composition of the group by adding or removing peer entities so as to move back the group to meet the stability requirement. Advantageously, at each change of the composition of the group, the modules are adapted to inform the peer entities of the group so that they can update their group list associated with the data object. Advantageously, at each change of the composition of the group, the modules are adapted to update the group list thereof, which is associated with the data object.

Advantageously, the modules of each peer entity are adapted to periodically send a heartbeat message, which is indicative of the presence of the peer entity within the peer-to-peer system.

Typically, the modules of each peer entity are advantageously adapted to hold a neighbour list comprising a number of peer entities of the peer-to-peer system.

Preferably, the modules of each peer entity are advantageously adapted to hold an access point table (APT) comprising a list of data objects stored within the peer-to-peer system, wherein each data object is associated with a peer entity of the peer-to-peer system that stores the data object.

Advantageously, the modules of each peer entity are adapted to periodically exchange, with another peer entity of the peer-to-peer system, information about the data objects stored therein, if any, and the corresponding group lists.

Advantageously, after each exchange of information with said another peer entity, the modules of each peer entity are adapted to update the APT of the peer entity by substituting a pair data object/associated peer entity, as stored in the APT, with another pair data object/associated peer entity, by using the information received at the exchange of information with said another peer entity.

Advantageously, when, at one of said periodic exchanges of information, the modules of the peer entity realize that the another peer entity stores a same data object as the peer entity but that the group list associated with said data object by the other peer entity is different from the group list associated with the data object by the peer entity itself, then the peer entity modules are adapted to execute a recovery procedure adapted to modify the peer entity group list so as to include all the peer entities belonging to the two different group lists.

Advantageously, according to said recovery procedure, the modules of the peer entity are also adapted to send information about the modified group list to all the peer entities belonging to the modified group list so that they can also modify their group list associated to the relevant data object.

Advantageously, the modules of each peer entity are such that, when the peer entity receives by a requesting entity (e.g., a user or another peer entity) a request to retrieve a data object from the peer-to-peer system, they are adapted to check if the peer entity locally stores the data object and, in the positive case, to provide the requesting entity with the data object. In the negative case, the modules are adapted to access the peer entity APT to check if there is information on a peer entity that stores the requested data object.

Advantageously, the modules of each peer entity are such that, when the peer entity receives by a requesting entity (e.g., a user or another peer entity) a request to update a data object, they are adapted to check if the peer entity locally stores the data object and, in the positive case:
  to update the data object, if necessary (that is, if the data object has not already been updated), and
  to forward the request for the update to all the peer entities comprised in the peer entity group list, which is associated with the data object itself.

In the negative case, the modules are adapted to access the peer entity APT to check if there is information on a peer entity that stores the data object. In the positive case, the modules are advantageously adapted to send the request for the update to the peer entity found in the APT. In the negative case, the modules are advantageously adapted to send the request to a peer entity chosen (typically in a random way) from the peer entity neighbour list.

As far as further features of this second aspect of the invention are concerned, reference is made to what already described above with reference to the first aspect of the invention.

The features and advantages of the present invention will be made apparent by the following detailed description of some exemplary embodiments thereof, provided merely by way of non-limiting examples, description that will be conducted by making reference to the attached drawings, wherein:

FIG. 1 schematically shows a peer-to-peer system according to an embodiment of the invention;

FIG. 2 schematically shows an exemplary implementation scenario for the peer-to-peer system of FIG. 1;

FIG. 3 schematically shows a flow chart of a data object storing procedure according to an embodiment of the invention;

FIGS. 4a and 4b schematically show a Profiles data structure and a Stored Object data structure according to an embodiment of the invention;

FIG. 5 schematically shows a flow chart of a procedure for keeping a group of peer entities stable, according to an embodiment of the invention;

FIGS. 6a and 6b schematically show an exemplary scenario of shuffle operation according to an embodiment of the invention;

FIG. 7 schematically shows an exemplary scenario of data objects distribution according to an embodiment of the invention;

FIG. 8 schematically shows an example of structure of a message exchanged during a shuffle operation according to an embodiment of the invention;

FIG. 9 schematically shows an example of structure of an APT table according to an embodiment of the invention;

FIG. 10 schematically shows a flow chart of a data object retrieval procedure according to an embodiment of the invention;

FIG. 11 an exemplary scenario of a data object retrieval procedure implemented according to the embodiment of FIG. 10;

FIG. 12 schematically shows a flow chart of a data object update procedure according to an embodiment of the invention;

FIGS. 13a and 13b schematically show an exemplary scenario of a recovery procedure according to an embodiment of the invention.

FIG. 1 shows a peer-to-peer system 1000 comprising a plurality of peer entities 100.

In the peer-to-peer system 1000, each peer entity 100 is advantageously univocally identified by an identifier (e.g., an IP address).

In order to guarantee peer entities connections over the time, each peer entity 100 keeps linked with a plurality of neighbour peer entities (hereinafter also called neighbours).

Each peer entity 100 advantageously holds a local neighbour list (not shown in the figures) with the identifiers of the neighbour peer entities with which it is linked. The creation or deletion of a link with a given peer entity may be carried out by adding or deleting into or from said local list the identifier of the given peer entity.

According to a preferred embodiment, the peer-to-peer system 1000 is an unstructured peer-to-peer system wherein the topology of the peer-to-peer system is unrelated to the location of data stored in the system and peer entities are linked according to a random scheme.

Relationships among neighbour peer entities are advantageously managed according to a predetermined overlay maintenance protocol that supports a uniform sampling mechanism.

For example, the overlay maintenance protocol can be of the type disclosed by S. Voulgaris et al. ("CYCLON: Inexpensive Membership Management for Unstructured P2P Overlays", Journal of Network and Systems Management, 13(2), 2005), which follows a proactive approach where peer entities perform a continuous periodical gossiping activity with their neighbours in the overlay. The periodical gossiping phase (named "shuffle cycle") has the aim of randomly mixing the neighbour lists between neighbour peer entities.

It is assumed that peer entities 100 are adapted to exchange data according to a common communication protocol (e.g., TCP/IP).

As shown in FIG. 2, peer entities 100 can be deployed on a potentially huge amount of servers 1030 (and cluster of servers) and end-user terminals 1020, interconnected through a communication network 1010 (e.g., the Internet or a network platform provided by a telecommunication network provider). In addition, end-user terminals 1020 can be interconnected to the communication network 1010 through a telecommunication access network 1012 (such as ADSL, dial-up, GPRS, 3G UMTS, WiFi, WiMax, and similar).

The servers 1030 may be heterogeneous, in terms of hardware, software, operating system, and similar.

End-User terminals 1020 typically are devices owned and managed by end-users.

An end-user terminal 1020 can exemplarily be a mobile or fixed device as, for example, a cell phone, a PDA, a laptop, a Personal Computer and similar.

Accordingly, peer entities 100 are heterogeneous both in availability and in physical resources (e.g. storage capacity).

Indeed, peer entities 100 can be placed in two availability classes: always-on and cycled. The servers 1030 typically are of the always-on class in that they are almost always on and typically have larger amounts of available storage. End-User terminals 1020, on the other hand, typically are of the cycled class in that they are typically down for large parts of the day and may have less storage available for sharing.

Any way, each peer entity 100 advantageously comprises some storage space for storing data objects.

In the following, it is exemplarily assumed that, at any time, the overall storage capacity of the system 1000 is such as to allow storage of a data object.

It is also exemplarily assumed that a data object can be inserted in the system 1000 and updated only by a peer entity that represents the owner of the data object.

Each data object in the peer-to-peer system 1000 is univocally identified by an identifier.

In the present description and claims, the term "data object" is used to indicate the data object itself or a fragment of the data object (e.g., according to erasure codes). In general, the term "data object" is used to indicate a data structure representing any type of information.

Examples of data objects can be data structures representing user profiles (that comprise, for example, the IP address of the device and the ID of the user), video and/or audio files, text files, and similar.

Peer entities 100 comprise (software and/or hardware) modules adapted to implement the invention in the various aspects thereof.

FIG. 3 schematically shows a data object storing procedure for storing a data object into the peer-to-peer system 1000 according to an embodiment of the invention.

According to the procedure shown in FIG. 3, when a peer entity 100 representing the owner of a data object desires to store the data object into the peer-to-peer system 1000, it creates a group (block 30) and adds into the group a peer entity randomly chosen among the neighbour peer entities thereof (block 31). The owner peer entity may be or may be not part of the group.

Then the owner peer entity computes the stability value of the group to verify the expected durability of the data object inside the group (block 32) and compares the obtained stability value with a threshold value representing a desired stability value (block 33). When the stability value is higher than the threshold value, the owner peer entity send instructions to each peer entity of the group to store the data object so that a replica of the data object is stored into each peer entity of the group (block 34). The instructions advantageously comprise a list of the peer entities forming the group.

If the stability value is smaller than the threshold value, then the owner peer entity adds into the group another peer entity randomly chosen among the neighbour peer entities thereof (block 35) and the procedure continues at block 32.

Preferably, stability of a group is computed by using the following stability function f(G), which has been defined by the Applicant itself:

$$f(G) = \sum_{i=1}^{|N_G|} f_i \text{ where } f_i = \begin{cases} w_s/h & \text{if } S_i < S_{short} \\ w_m/h & \text{if } S_{short} \leq S_i \leq S_{long} \\ w_l/h & \text{if } S_i \geq S_{long} \end{cases}$$

wherein $N_G$ is the number of peer entities belonging to the group and $S_i$ represents the current session time (expressed in hours) of the i-th peer entity of the group. The session time represents the time of permanency of a peer entity in the system and is used to quantify the expected availability of each peer entity.

Three levels of availability, corresponding to three different ranges of session times, have been considered in the formula: low level of availability ($S_i < S_{short}$), medium level of availability ($S_{short} \leq S_i \leq S_{long}$) and high level of availability ($S_i \leq S_{long}$)

Hence, according to the formula, $f_i$ can be one out of three values, depending on the session time $S_i$: if $S_i$ is lower than a parameter $S_{short}$ (which represents a typical duration of short sessions, expressed in hours, e.g. $S_{short}$=2 hours), then $f_i = w_s/h$; if $S_i$ is between $S_{short}$ and $S_{long}$ (the latter representing a typical duration of long sessions, expressed in hours, e.g. $S_{long}$=7 hours), then $f_i = w_m/h$; if $f_i$ is above $S_{long}$, then $f_i = w_l/h$. $S_{short}$ and $S_{long}$ are system-wide parameters (that are the same for all peer entities) that can be tuned by a system administrator, according to characteristics peculiar to the peer-to-peer system. Moreover, $S_{short}$ represents a session duration below which a session time $S_i$ can be considered short, i.e. a session time of a very dynamic peer entity; vice versa $S_{long}$ represents the minimum value above which a session time Si can be considered long, i.e. a session time of a very stable peer entity.

h is a system-wide parameter (that is the same for all peer entities), which represents a predicted minimum number of peer entities with the smallest expected session duration (i.e. with session duration shorter than $S_{short}$), which are necessary to emulate a failure free server (e.g. h=10). The value of h can be tuned according to the dynamism of the peer-to-peer system 1000 in terms of entry/exit rate of the peer entities in/from the peer-to-peer system 1000.

$w_s/h$ represents the weight of a peer entity having small session time (i.e. $S_i < S_{short}$); wm/h represents the weight of a peer entity having medium session time (i.e. $S_{short} \leq S_i < S_{long}$) ; and $w_l/h$ represents the weight of a peer entity having large session time (i.e $S_i \geq S_{long}$) $w_s$, $w_m$, $w_l$ are system-wide parameters (that are the same for all peer entities) of which $w_s$ is equal to 1 and $w_m$ and $w_l$ can be tuned, according to the system characteristics and according to the preferences of the administrator. However the following relationship must be met: $w_s < w_m < w_l$.

Exemplary values can be, in case of h=10, $w_m$=3 and $w_l$=9; $w_s$ is set to 1 by default. The exemplary values 1/h, 3/h and 9/h have been determined by the Applicant on the basis of the peer behaviour observed up to today in real peer-to-peer systems.

Alternatively, $w_s$, $w_m$ and $w_l$ can be a function of the parameter h: e.g. they could respectively be equal to h/10, h/2 and h.

In order to compute the stability function f(G), a peer entity can retrieve the session times of the peer entities involved in the computation from the peer entities themselves or from a central database.

According to the stability function f(G), the stability value for a group G is computed as the sum of the $f_i$ of all peer entities belonging to group G.

The group G is considered to be stable once the stability function f(G) has value at least equal to 1 (i.e. when the peer entities that store the replicas of the data object globally have an expected stability value similar to a failure-free server). This also explain why $w_s$ must be set to 1: in this way, if one group G is formed by exactly h peer entities with $S_i<S_{short}$, f(G) sums up to 1 and the group is stable. This guarantees that if the replicas are stored into a set of very unstable peer entities, they are so many to guarantee that not all of them will leave the system in an expected period of time, provided that these peer entities leave the system more or less independently from each other.

The main idea behind the stability function f(G) is based on the observation that a data object stored into a failure-free server will be always available. The stability function f(G) thus computes how many peer entities are sufficient to emulate a failure free server, considering that peer entities are heterogeneous and, thus, have different expected availability.

In order to guarantee a reliable management of the replicas of a data object stored in the peer-to-peer system 1000, each peer entity 100 storing a replica of a given data object advantageously keeps contact information (e.g. IP address) of all the other peer entities of the group that store a replica of the data object.

FIGS. 4a and 4b show an example of data structures locally stored and handled by each peer entity 100.

FIG. 4a shows a Profile data structure wherein each peer entity stores a list of pairs (hereinafter called profiles) comprising each the identifier (ID) of a data object and a list of network identifiers (e.g., and $IP_A, \ldots IP_X$ and $IP_B, \ldots IP_Y$) of all the peer entities belonging to the group that stores this data object.

FIG. 4b shows a Stored Object data structure wherein, for each pair in the Profile data structure, the peer entity stores a pair, which comprises the identifier of the data object and the data object itself associated to that identifier.

It is noted that, once a group is formed, the stability value thereof may change over the time depending on the behaviour of the peer entities belonging to it. In particular, the stability value of the group raises over the time as the permanence time in the system 1000 of the peer entities increases. On the other hand, the stability value of the group decreases each time a peer entity of the group leaves the peer-to-peer system 1000.

According to a preferred embodiment of the invention, once a group is formed, the stability value thereof is monitored and kept stable over the time by a peer entity (hereinafter called primary peer entity) of the group.

The primary peer entity can be selected by the peer entities of the group according to a common deterministic criterion. For example, the peer entity having the highest session time or the numerically smallest network identifier can be selected.

Figure 5:
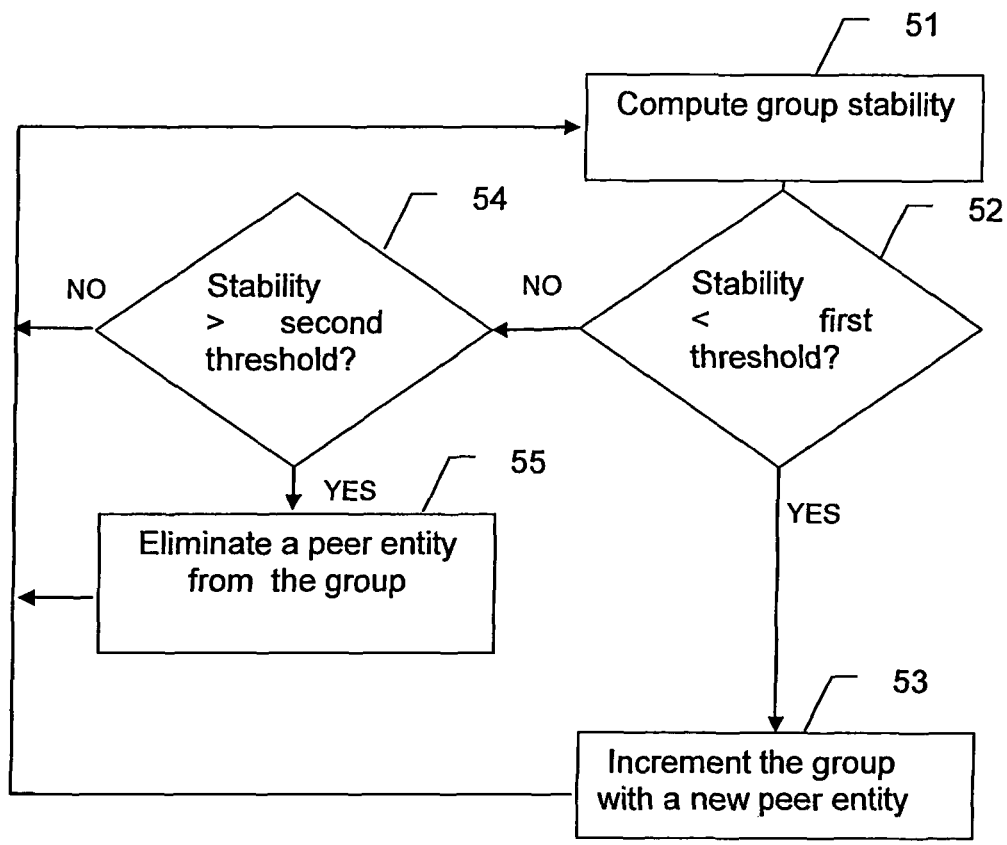

As shown in FIG. 5, the primary peer entity is adapted to periodically compute the current stability value of the group (block 51).

The current stability value of the group is advantageously computed by applying the stability function f(G). The primary peer entity can obtain the current session times of the other current peer entities of the group by sending a suitable request to them or by periodically exchanging suitable messages with them.

At each computation, the primary peer entity compares the computed stability value with a first threshold value (52).

If the computed stability value is lower than the first threshold value, the group is enlarged with a new peer entity (block 53) and the procedure continues at block 51.

If the computed stability value is higher than the first threshold value, the computed stability value is compared with a second threshold value, which is higher than the first threshold value (block 54). If the computed stability value is higher than the second threshold value, the group is reduced by eliminating one peer entity (preferably the most stable peer entity) (block 55) and the procedure continues at block 51.

Figure 1:
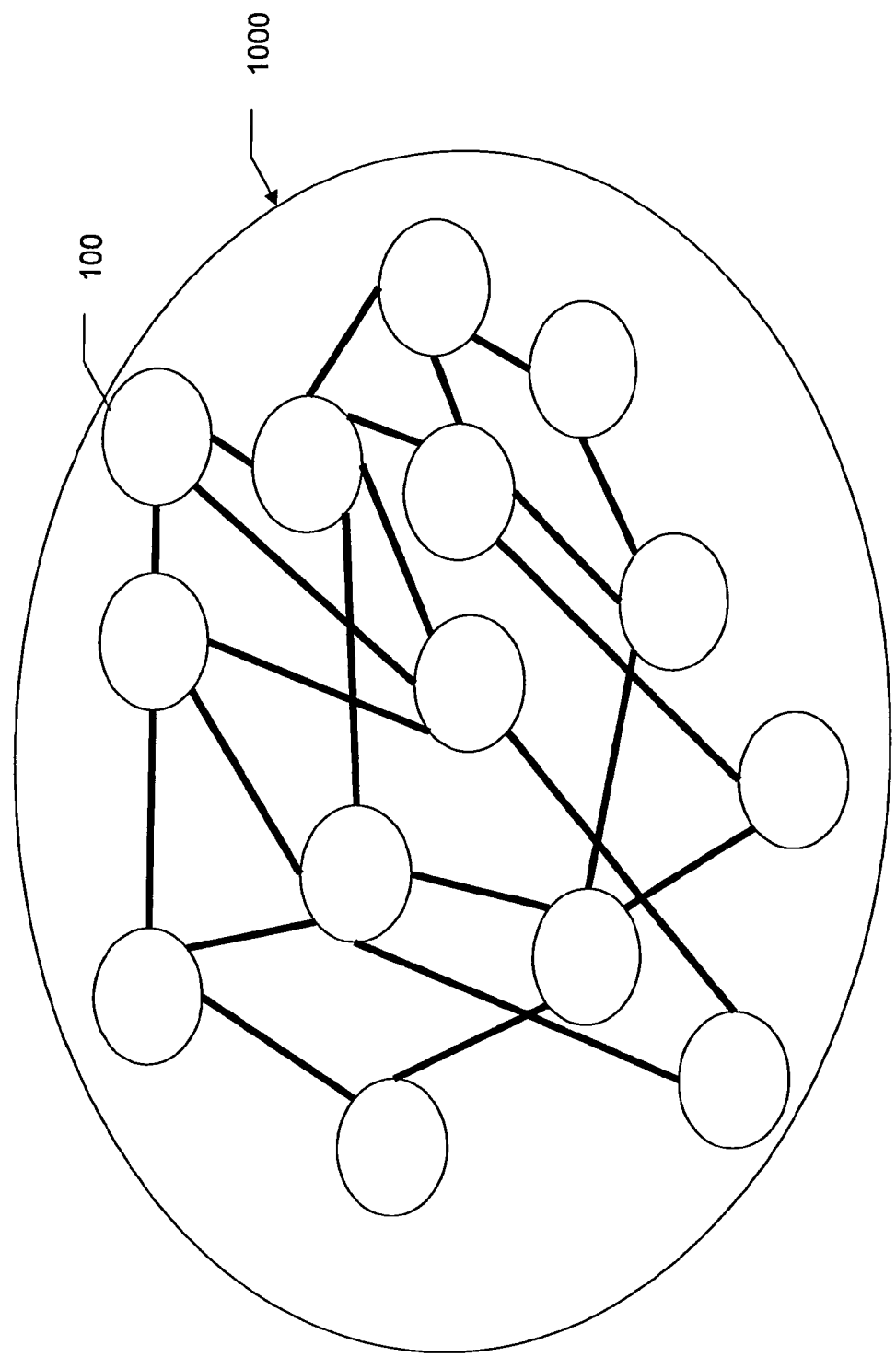
Figure 2:
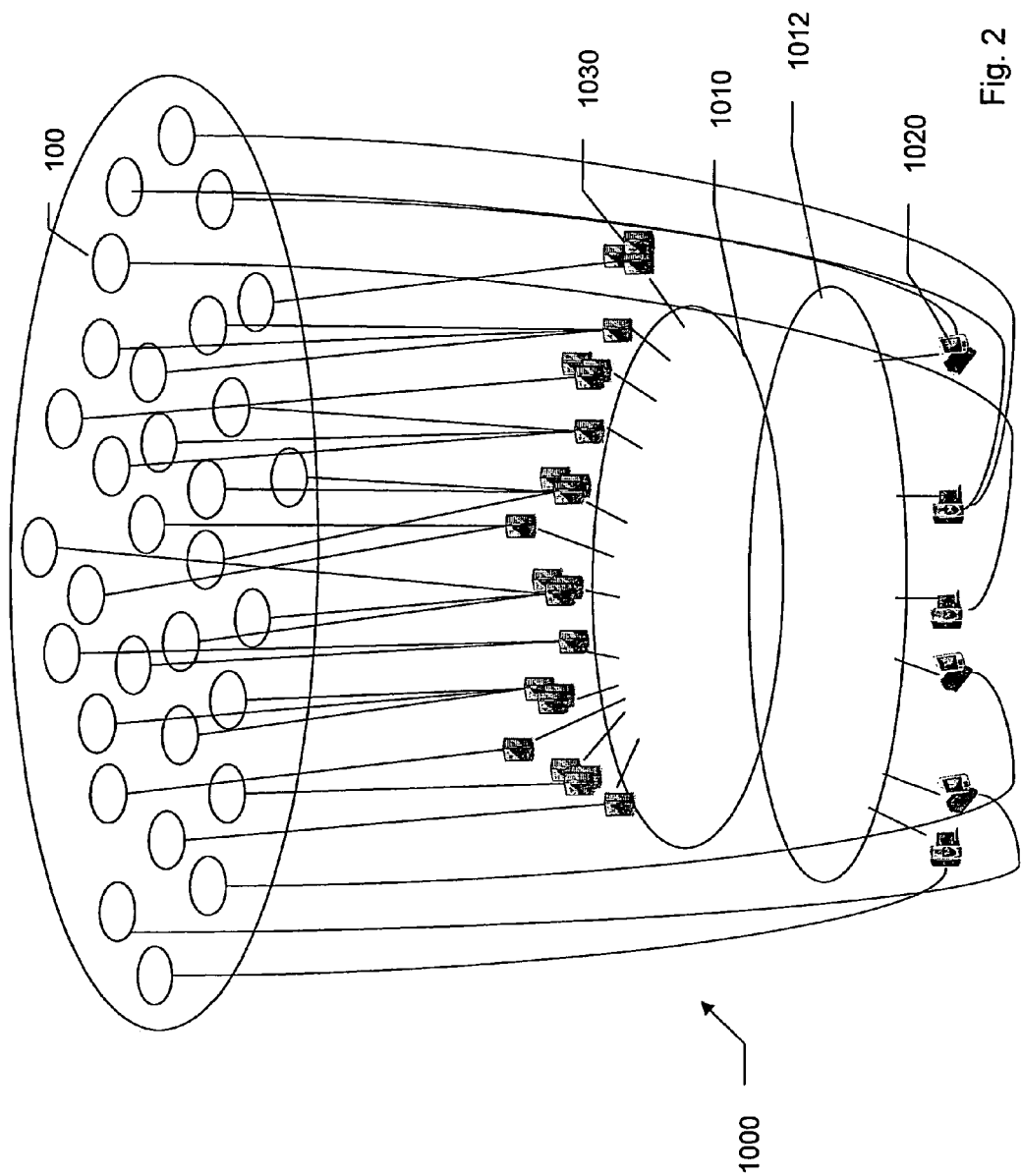
Figure 3:
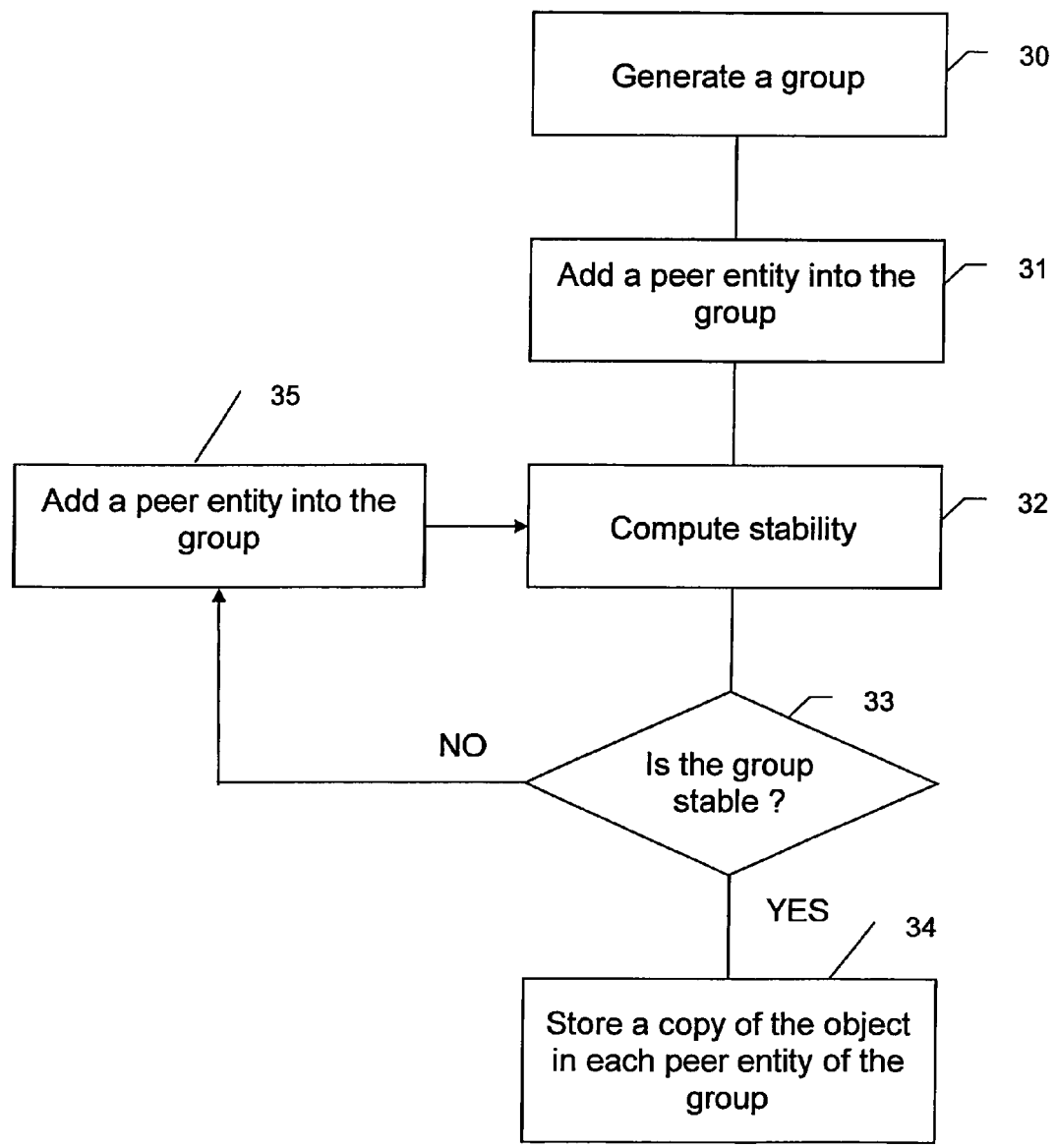

The first threshold can be the same as the threshold used in the procedure disclosed with reference to FIG. 3.

The use of two thresholds can be advantageous in order to avoid a continuous flow of peer entities entering/exiting in/from the group.

According to another embodiment, a single threshold can be used. The single threshold can be the same as the threshold used in the procedure disclosed with reference to FIG. 3.

Any time the composition of the group changes, the primary peer entity advantageously updates its Profile data structure and informs all peer entities of the group so that they can update their Profile data structure accordingly.

When the group is enlarged, the new peer entities can be randomly chosen among the neighbours of the primary peer entity and/or among the neighbours of some peer entities of the group.

The new chosen peer entities will update their Profile data structure to add a pair comprising the identifier of the data object stored in the group and a list of identifiers of all the peer entities that constitute the group. Moreover, the new chosen peer entities will update their Store Object data structure to add a pair comprising the identifier of the data object stored by the group and the data object itself.

In the light of what disclosed above, it will be clear that the invention implements an adaptive mechanism according to which the stability value of a group is kept monitored and maintained at the desired stability value over the time. Indeed, when the current stability value falls below the predetermined threshold, the primary peer entity enriches the group by requesting other peer entities to join the group and to store a replica of the data object. On the other hand, when the current stability value exceeds the predetermined threshold, the primary peer entity invites some peer entities to leave the group.

Advantageously, the primary peer entity sends the invitation to leave the group to the peer entities having the highest observed session times whose elimination does not lead the stability value of the group to fall below the threshold.

This allows peer entities of the always-on type to uniformly distribute, when possible, among the groups of the peer-to-peer system 1000.

Considering that the peer-to-peer system 1000 is heterogeneous, that peer entities 100 can be either of the always-on type or of the cycled type and that there is no a priori knowledge of peer entities behaviour (in term of permanency time in the peer-to-peer system 1000), the adaptive mechanism of the invention is advantageous in that it allows the composition of a group to be continuously adjusted depending on the behaviour of the peer entities of the group over the time.

In particular, the adaptive mechanism of the invention—by maintaining the stability value of a group stable over the time, despite the fact that peer entities 100 can join and leave the system 1000 in a dynamic and unpredictable way—ensures robust data retrieval by keeping the replication factor of the data object (i.e., the number of peer entities of the group) minimized.

Advantageously, in each group, the primary peer entity is the only one able to affect the composition of the group. Consequently, the composition of a group can change either by means of the actions of its primary peer entity (which enlarges or reduces the group to maintain the stability value of the group stable over the time) or when a peer entity of the group leaves deliberately the peer-to-peer system 1000 (e.g., because a user turns his end-user terminal off) or fails (e.g., because the battery of an end-user terminal runs down). It is exemplarily assumed that a peer entity cannot autonomously decide to leave the group unless it leaves the peer-to-peer system 1000.

Advantageously, each peer entity of a group periodically sends a message (known in the art as heartbeat message) to the primary peer entity of the group to notify it of its presence in the peer-to-peer system 1000 (i.e., that it is "alive").

Similarly, each primary peer entity of a group periodically sends a heartbeat message to all the peer entities of the group to notify them that it is alive.

The use of heartbeat messages advantageously allow to detect departure of a peer entity from the system 1000.

In particular, the primary peer entity advantageously controls to periodically receive the expected heartbeat messages from all the peer entities of the group. If the primary peer entity does not receive an expected heartbeat message from a peer entity of the group it suspects such peer entity of departure from the system 1000. When the primary peer entity suspects a peer entity of departure from the system 1000, it removes the identifier of the suspected peer entity from the list of identifiers (e.g., $IP_A, \ldots IP_X$ in FIG. 4a) that, in the Profile data structure of the primary peer entity, is associated with the identifier of the data object stored by the group. Furthermore, the primary peer entity informs the other peer entities of the group about the suspected peer entity so that they can update their Profile data structure accordingly.

In addition, if, during a periodic computation according to the procedure of FIG. 5, the stability value of the group, deprived of the suspected peer entity, falls below the first threshold value, the primary peer entity adds one or more new peer entities into the group so as to keep the stability value of the group stable over the time.

Likewise, each peer entity of a group advantageously controls to periodically receive the expected heartbeat messages from the current primary peer entity. If it does not receive an expected heartbeat message from the primary peer entity, it suspects the primary peer entity of departure from the peer-to-peer system 1000 and elects a new primary peer entity according to the above mentioned common deterministic criterion.

Furthermore, when a peer entity suspects the primary peer entity of departure, it removes the network address of the primary peer entity from the list of identifiers that, in the Profile data structure, are associated with the pertinent data object identifier.

Because of the asynchrony of the peer-to-peer system 1000, it can happen that some peer entities are falsely suspected. Moreover, when a primary peer entity is suspected of departure, and the other peer entities of the group elect a new primary peer entity, it can happen that different peer entities elect a different primary node. This can cause a partition of the group.

Indeed, due to the asynchrony of the peer-to-peer system, heartbeat messages can be sent by different peer entities at different moments. In addition, there is no control that the heartbeat messages, once sent, are then actually received by the addressee peer entities.

It is noted that while the partition of a group does not impact on the data object durability, it could impact on the consistency of data object updating. Indeed, it can happen that only the replicas of a data object that belong to one of the partitioned groups is updated and maintained consistent.

The present invention overcomes this problem by providing that, at each shuffle operation, peer entities 100 exchange information about the data objects they store, i.e. information about the groups they are part of.

As already mentioned above, shuffle operations are periodically executed by peer entities 100 to manage relationships among neighbour peer entities according to a predetermined overlay maintenance protocol as, for example, the one disclosed by the above mentioned article by S. Voulgaris et al. ("CYCLON: Inexpensive Membership Management for Unstructured P2P Overlays", Journal of Network and Systems Management, 13(2), 2005).

Figure 7:
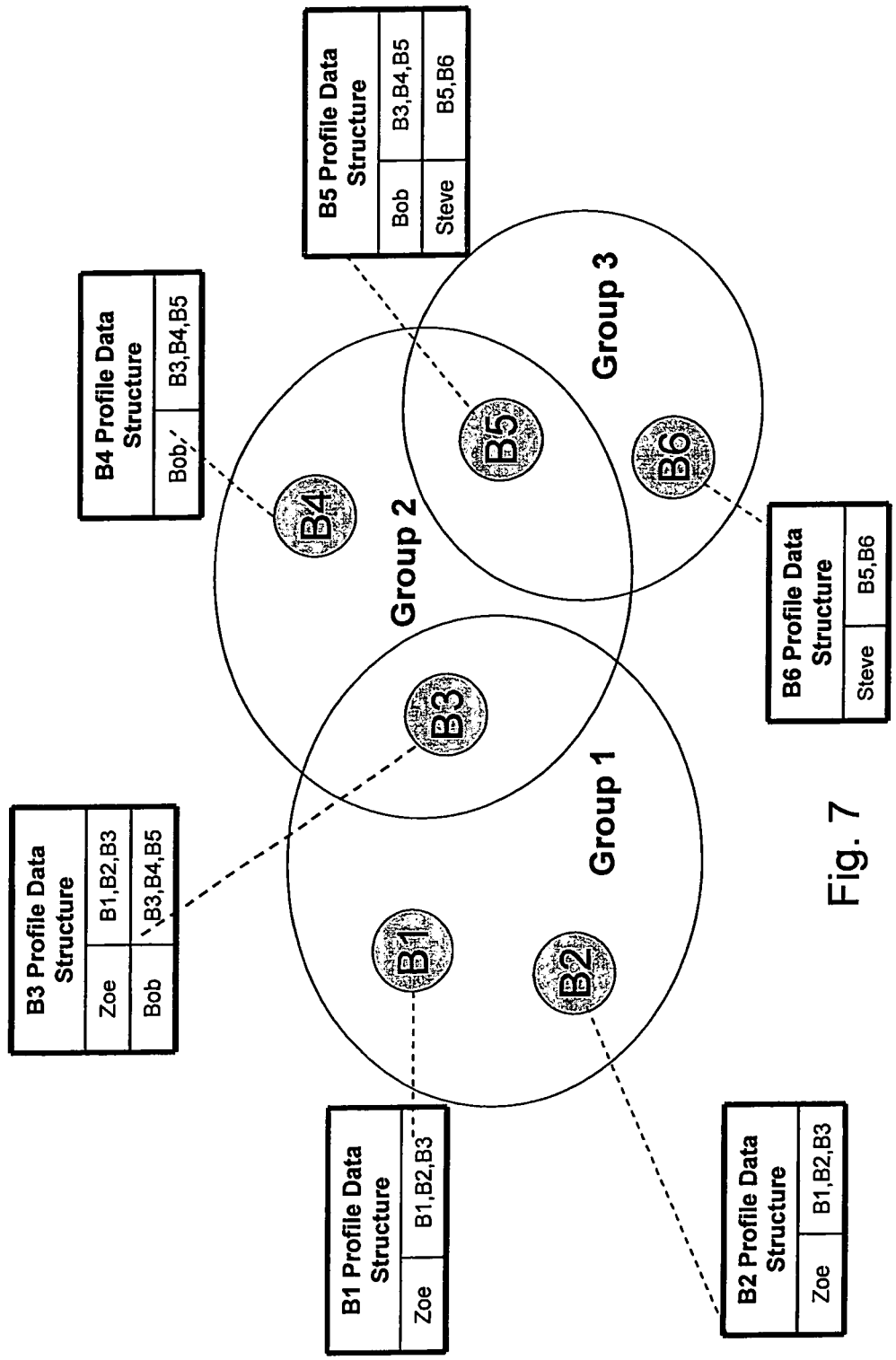

FIG. 6a shows an exemplary scenario showing the information that can be exchanged by peer entity B2 and peer entity B5 during a shuffle operation, when the data objects distribution is the one exemplarily shown in FIG. 7.

In the exemplary scenario, B1's neighbours are B2 and B4; B2's neighbours are B1, B3 and B5; B3's neighbours are B2 and B5; B4's neighbours are B1 and B5; B5's neighbours are B2, B3, B4 and B6; and B6's neighbour is B5. Moreover, three groups are shown of which: group 1 stores replica of a data object whose identifier is "Zoe" and comprises peer entities B1, B2, B3; group 2 stores replica of a data object whose identifier is "Bob" and comprises peer entities B3, B4 and B5; and group 3 stores replica of a data object whose identifier is "Steve" and comprises peer entities B5 and B6.

Accordingly, in the Profile data structure of B1, there is a pair Zoe-B1, B2, B3. In the Profile data structure of B2, there is a pair Zoe-B1, B2, B3. In the Profile data structure of B3, there is a pair Zoe-B1,B2,B3 and a pair Bob-B3,B4,B5. In the Profile data structure of B4, there is a pair Bob-B3,B4,B5. In the Profile data structure of B5, there is a pair Bob-B3,B4,B5 and a pair Steve-B5,B6. In the Profile data structure of B6, there is a pair group Steve-B5,B6.

In FIGS. 6a and 6b, each peer entity is also associated with a respective APT (Access Point Table).

An APT is a table held by each peer entity 100, which comprises a list of data objects stored into the peer-to-peer system 1000, wherein each data object is associated with a peer entity of the peer-to-peer system that stores the data object (i.e., the data object itself of a replica of the data object). As shown in FIGS. 6 and 9, each entry in the APT is a pair wherein the first element is a data object identifier and the second element is an identifier (e.g. IP address) of a peer entity belonging to a group that stores that data object.

As shown in FIG. 6a, in the shuffle operation, B2 sends a message to B5 containing a list of peer entities identifiers (e.g., a random subset of B2's neighbours—in the example, B3 and B1— and B2's identifier) and the identifiers of the data objects stored by B2 (in the example, Zoe) with the corresponding lists of peer entities (in the example, B1,B2, B3) that belong to the groups storing said data objects. Similarly, B5 sends a message to B2 containing a list of peer entities identifiers (e.g., a random subset of B5's neighbours—in the example, B3 and B6— and B5's identifier) and the identifiers of the data objects (in the example, Bob and Steve) stored by B5 with the corresponding lists of peer entities (in the example, B3,B4,B5 and B5,B6) that belong to the groups storing said data objects.

FIG. 8 shows an exemplarily structure of the message exchanged in the shuffle operation.

As shown in FIG. 6b, at each shuffle operation, each peer entity substitutes a randomly selected pair of its APT with a new pair, randomly selected among the information received by the other peer entity during the shuffle operation. In the example, as a result of the execution of the shuffle operation of FIG. 6a, in B2'APT the pair Zoe-B2 has been substituted with the pair Steve-B5 and in B5'APT the pair Bob-B4 has been substituted with the pair Zoe-B2.

According to a preferred embodiment of the invention, when, during an exchange of messages at a shuffle operation, a peer entity belonging to a group detects that another peer entity, which stores the same data object, belongs to a different group, the peer entity starts a recovery procedure. Advantageously, in the recovery procedure, the peer entity merges the peer entities belonging to the two groups into a single merged group. Then, it sends to all the peer entities belonging to the single merged group a suitable message to restore the group. The message will contain the list of the peer entities and the last update of the data object. Once the group is restored, a new primary peer entity is elected. According to the procedure disclosed above, the new primary peer entity will monitor the stability value of the new group to bring and maintain it at the desired threshold value.

FIG. 13 shows an exemplary scenario wherein peer entities B2 and B5 both store the data object Steve but belong to two different groups: B1, B2 and B5; B6, respectively.

FIG. 13a shows a shuffle operation wherein B2 sends a message to B5 containing a list of peer entities identifiers (e.g., B2, B3, B1), and the identifier (Steve) of the data object stored by B2 with the list of peer entities (in the example, B1,B2) that, in the Profile data structure of B2, are associated with said data object. Similarly, B5 sends a message to B2 containing a list of peer entities identifiers (e.g., B5, B3, B6), and the identifiers (Bob and Steve) of the data objects stored by B5 with the respective lists of peer entities (in the example, B3,B4,B5 and B5,B6) that, in the Profile data structure of B5, are associated with said data objects.

FIG. 13b shows the result of the execution of the shuffle and recovery operations according to which, in the Profile data structures of B2 and B5, the two groups B1,B2 and B5,B6 have been merged into a single group B1, B2, B5, B6.

In order to retrieve a data object from the peer-to-peer system 1000, a user can advantageously invoke a data object retrieval procedure passing the data object identifier as input to a peer entity 100, which is deployed on its end-user terminal (e.g., a mobile phone).

Figure 10:
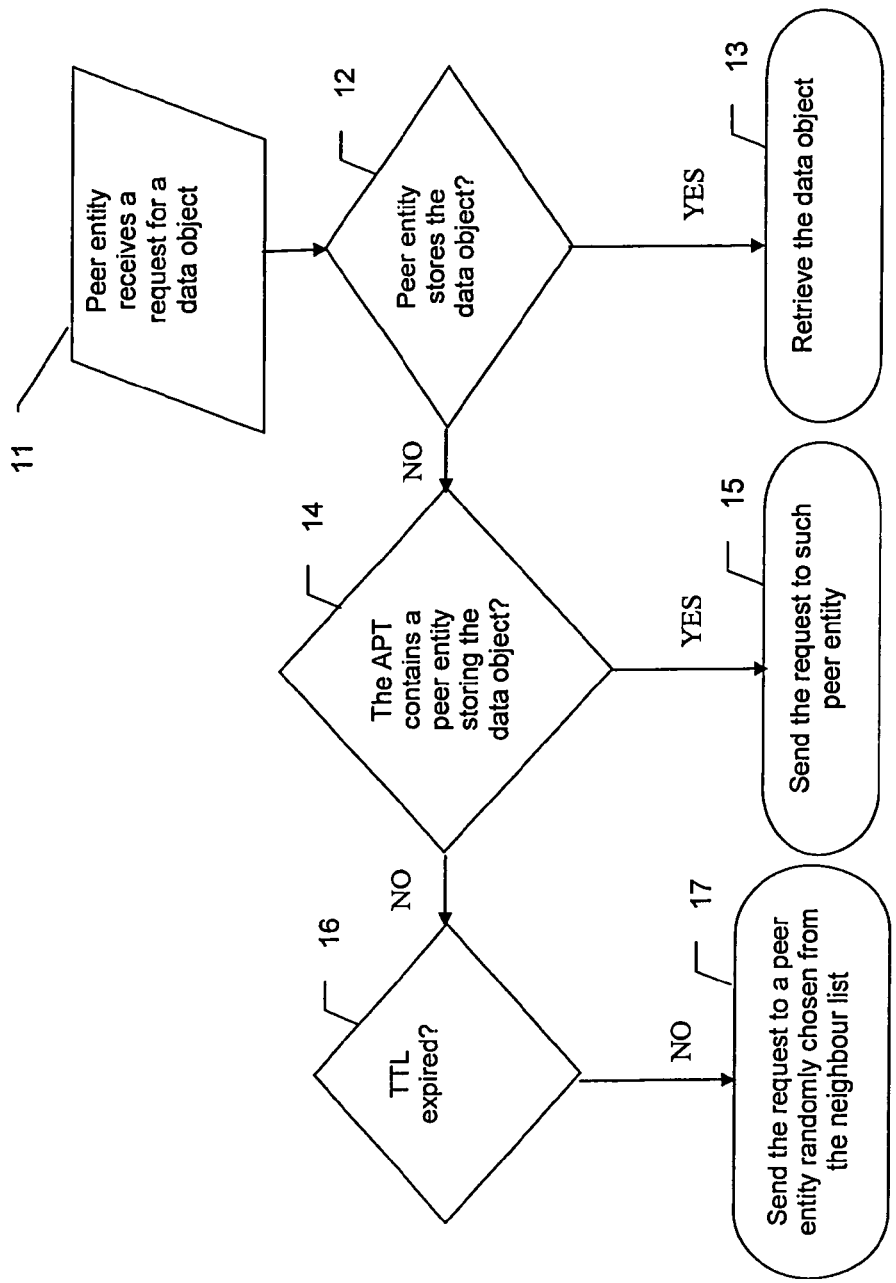

According to an exemplarily embodiment shown in FIG. 10, at the receipt of said input (block 11), peer entity 100 accesses his Stored Object data structure to check if the requested data object is stored by the peer entity itself (block 12). In the positive, peer entity 100 retrieves the requested data object and returns it to the user (block 13).

In the negative case of block 12, peer entity 100 accesses his APT to check if there is an identifier of a peer entity that stores the requested data object (block 14).

In the positive case of block 14, peer entity 100 sends the request to the peer entity retrieved from its APT (block 15), which—at the receipt of the request—will execute itself the steps of FIG. 10, blocks 11-17.

In the negative case of block 14, peer entity 100 checks if a predetermined TTL (Time To Live) has expired (block 15).

If the TTL has not expired, peer entity 100 sends the request to a peer entity randomly chosen from its neighbours list (block 17), which—at the receipt of the request—will execute itself the steps of FIG. 10, blocks 11-17.

If the TTL has expired the procedure ends.

Accordingly, the data object retrieval procedure ends either when a peer entity managing the searched data object is found or when a given number of steps (defined by the TTL) expires. This is advantageous in terms of system scalability.

Figure 11:
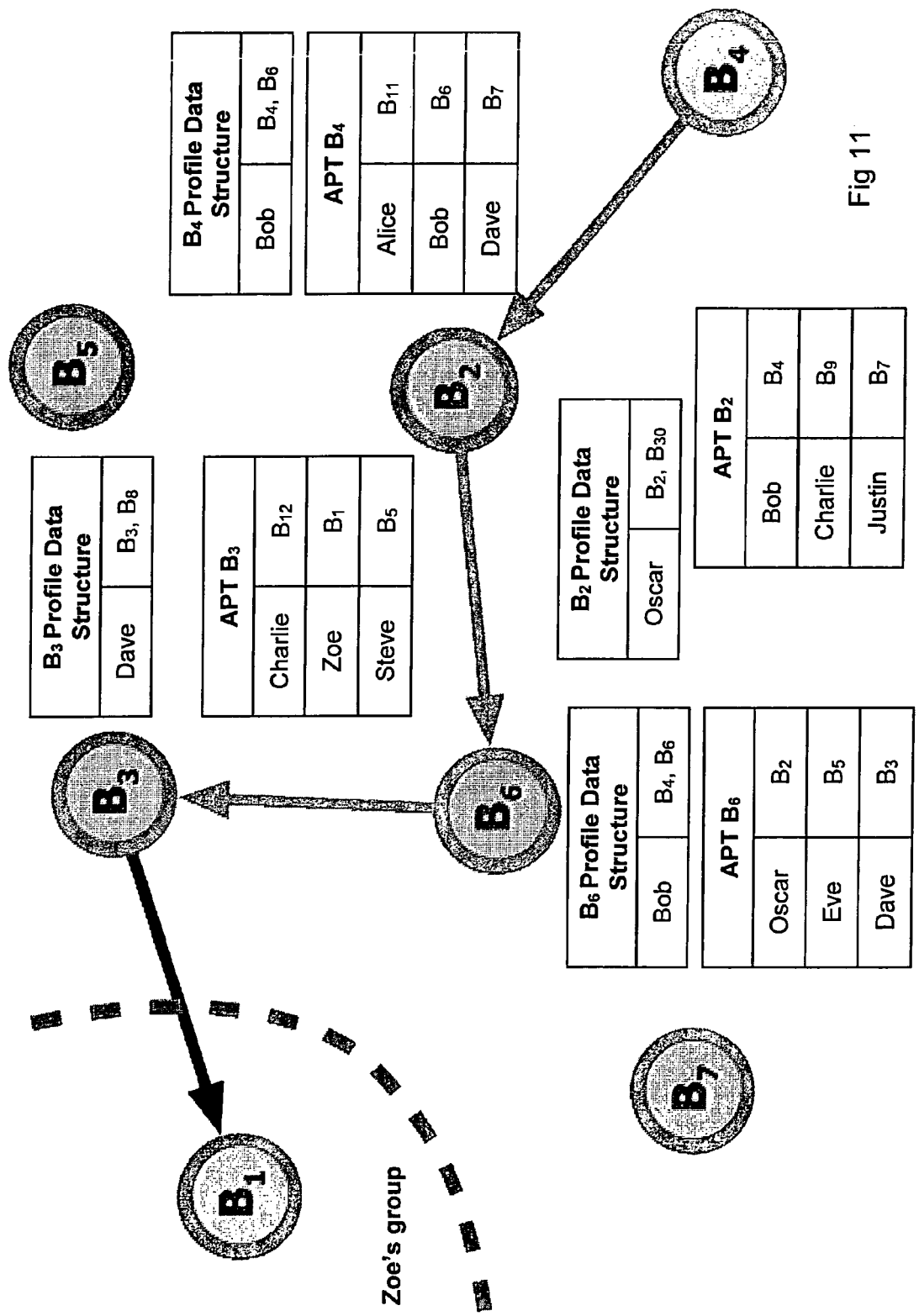

FIG. 11 shows an example wherein a generic user starts a data object retrieval procedure from peer entity B4 to obtain the data object whose identifier is Zoe. Peer entity B4 searches for the identifier Zoe in its Profile data structure and in its APT but does not find one. Thus it propagates the data object retrieval request to B2, a random peer entity obtained from its neighbour list (not shown). B2 repeats the same operations. This procedure continues until the data object retrieval request reaches a peer entity whose Profile data structure or APT contains the identifier Zoe. In the example, this peer entity is represented by B3, that forwards the request to the peer entity (B1), which in B3'APT is associated with Zoe. Peer entity B1, which is part of the group storing the data object Zoe, retrieves the data object Zoe from its Stored Object data structure and returns this information to the original requester, i.e. B4. In case the searched data object does not exist, the procedure is blocked after a predefined number of steps (defined by the TTL parameter).

In a preferred embodiment, the present invention guarantee a given fixed probability of succeeding in retrieving data objects, despite the fact that the random walk has a given TTL and the size of the peer-to-peer system 1000 can continuously expand due to its dynamism.

As mentioned above, the present invention implements a distributed index in which each peer entity locally manages an APT table to store identifiers of peer entities that store data objects in the system 1000.

The Applicant has observed that the probability to find a data object is inversely proportional to the number of data objects stored in the peer-to-peer system and directly proportional to the dimension of the APT table and the number TTL, which defines the maximum number of steps a data object retrieval procedure can last.

Formally, the Applicant found that such probability can be given by the following formula:

$$Pr(\text{success}) = 1 - \left(1 - \frac{|APT|}{|\text{data}|}\right)^{TTL}$$

Based on this perception, in a preferred embodiment of the invention, the Applicant adopted a suitable APT management mechanism, which allows to keep the probability of retrieving a data object constant despite the dynamism of the peer-to-peer system.

The adopted mechanism, which is similar to the sample and collide mechanism proposed by L. Massoulié et al. ("Peer counting and sampling in overlay networks: random walk methods", In proceedings of the twenty-fifth annual ACM symposium on Principles of distributed computing, 2006), provides that each peer entity is adapted to continuously analyze the content of its local APT and to estimate the overall number of data objects stored in the system by looking at the variability of the data object identifiers contained in its APT table. This estimation is then used by each peer entity to adapt at run-time the APT size.

According to this mechanism, if the number of data objects stored in the peer-to-peer system 1000 increases also the sizes of the APTs increase. The probability of succeeding in retrieving a data object in the peer-to-peer system 1000 can thus be kept constant, despite the TTL and the fact that the size of the peer-to-peer system 1000 can continuously expand due to its dynamism.

Data objects stored in the peer-to-peer system 1000 can be modified by the owner of the data object at any time.

According to a preferred embodiment of the invention, once the owner of a data object generates an update of its data object, said update is applied to all the replicas of the data object that are stored in the system 1000.

In particular, when a peer entity 100 representing the owner of a data object generates a new update of the data object, it sends the update to a peer entity randomly chosen among the neighbour peer entities thereof.

Figure 12:
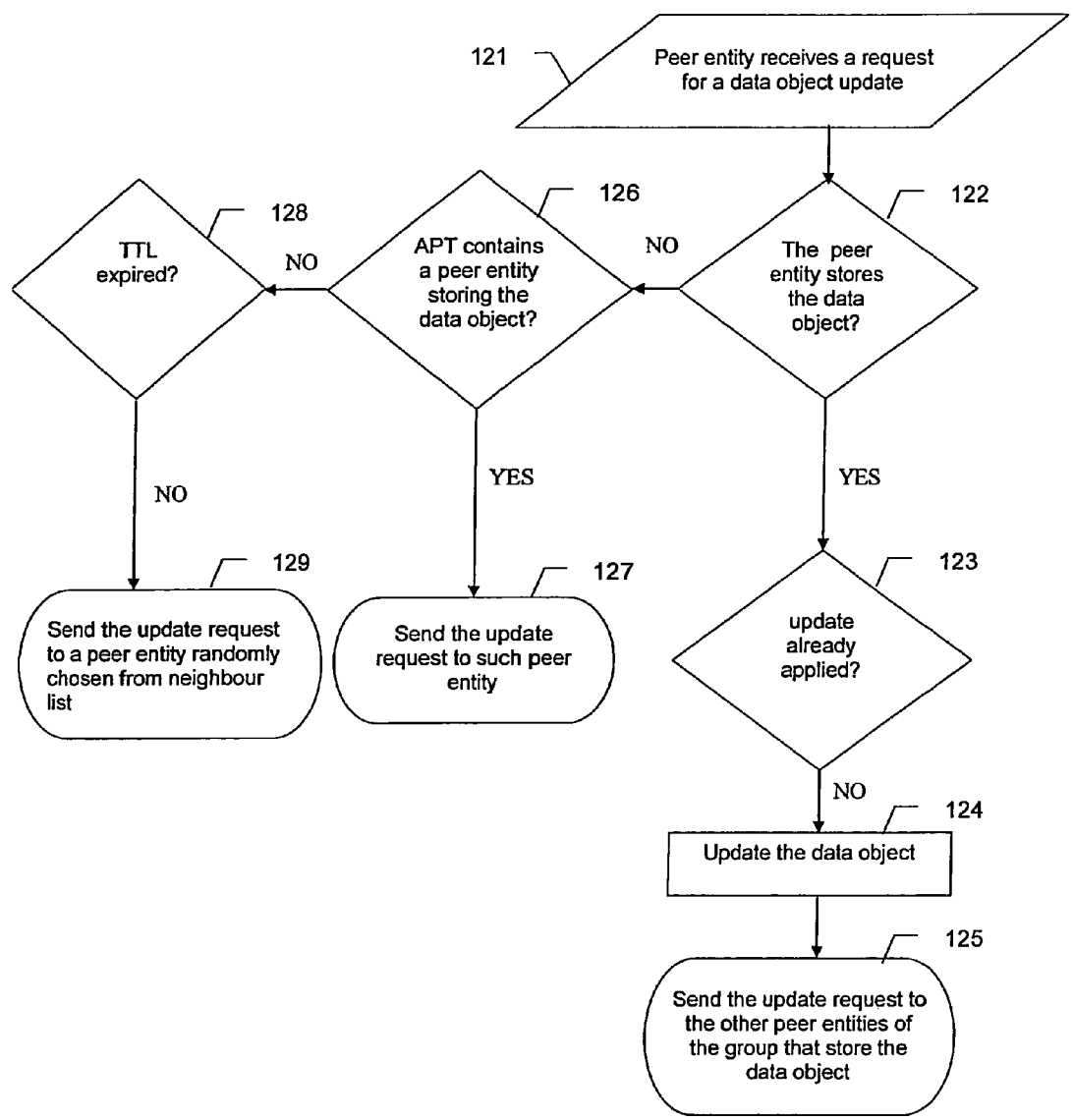

As exemplarily shown in FIG. 12, when a peer entity receives the request to update the data object (block 121), it verifies in its Profile data structure (or Stored Object data structure) if it stores the data object (block 122). If the peer entity stores the data object, then it locally applies the update of the data object (if this update has not already been applied before—blocks 123-124) and then it forwards the update to all the other peer entities of the group that store the data object, by retrieving the identifiers of such peer entities from its Profile data structure (block 125). At the receipt of the update, the said other peer entities will execute themselves the update procedure of blocks 121-129

If the peer entity does not store the data object, then it accesses its APT to check if there is an identifier of a peer entity that stores the data object (block 126). In the affirmative case, it forwards the update to this peer entity (block 127) that, at the receipt of the update, will execute itself the update procedure of blocks 121-129. In the negative, it checks the TTL parameter (block 128) and if the TTL has not expired yet it forwards the update to a peer entity randomly chosen from its neighbours (block 129).

The updates are advantageously applied using the order on which they are generated. Since communication channels could mix the order of the messages, each update is univocally identified by a pair data object—sequence number. The latter represents the order the updates are generated and defines the order the updates should be applied, when received.

The invention claimed is:

1. A method for managing storage of data objects in a peer-to-peer system that includes a plurality of peer entities, wherein, for each data object to be stored into the peer-to-peer system the method comprises:
   a) establishing a group of peer entities so that the group meets a stability requirement according to predetermined stability rules;
   b) storing the data object into each peer entity of the group; and
   c) each peer entity of the group generating and maintaining a group list, associated with the data object, of the peer entities of the group,
   wherein the peer entities of the group, established in step a), elect a primary peer entity of the group, according to a common selection criterion, to periodically check if, according to the predetermined stability rules, the stability requirement of the group is maintained, and
   if, the stability requirement of the group is not met during the periodically checking, the primary peer entity changing the composition of the group by adding or removing peer entities to cause the group to meet the stability requirement and informing all the peer entities of the group to update their group list associated with the data object.

2. The method according to claim 1, further comprising periodically checking if, according to said predetermined stability rules, the stability requirement of the group formed in step a) is maintained over time.

3. The method according to claim 1, further comprising each peer entity of the peer-to-peer system maintaining an access point table comprising a list of data objects stored into the peer-to-peer system, wherein each data object is associated with a peer entity of the peer-to-peer system that stores the data object.

4. The method according to claim 3, further comprising each peer entity of the peer-to-peer system, which stores at least one data object and maintain a corresponding group list, periodically exchanging information about the at least one stored data object and the corresponding group list with another peer entity of the peer-to-peer system.

5. The method according to claim 4, further comprising, at each exchange of information with the other peer entity, each peer entity updating its access point table by substituting a pair data object/associated peer entity, as stored therein, with another pair data object/associated peer entity, by using the information received at the exchange of information with the other peer entity.

6. The method according to claim 4, further comprising, when, at one of said periodic exchanges of information, the peer entity realizes that the other peer entity stores a same data object as the peer entity and the group list associated with said data object by the other peer entity is different from the group list associated with the data object by the peer entity itself, the peer entity modifying its group list so as to include all the peer entities belonging to the two different group lists.

7. The method according to claim 6, further comprising the peer entity sending information about the modified group list to all the peer entities belonging to the modified group list to allow the peer entities to modify their group list associated with a relevant data object.

8. The method according to claim 7, wherein, the peer entities of the modified group list elect a common primary peer entity according to a common selection criterion.

9. The method according to claim 3, wherein, when one of the plurality of peer entities of the peer-to-peer system receives by a requesting entity a request to retrieve a data object from the peer-to-peer system, checking if the one of the plurality of peer entities locally stores the data object and, if so, providing the requesting entity with the data object.

10. The method according to claim 9, wherein, when the peer entity does not locally store the data object, the peer entity accessing its access point table to check if there is information on a peer entity of the peer-to-peer system that stores the requested data object and, if so, sending the request for the data object to such peer entity.

11. The method according to claim 1, further comprising, when one of the plurality of peer entities of the peer-to-peer system receives by a requesting entity a request to update a data object, the one of the plurality of peer entities checking if it locally stores the data object and, if so, updating the data object locally stored therein and forwarding the request for the update to the peer entities that are included in the group list thereof, which is associated with said data object.

12. The method according to claim 11, further comprising each peer entity of the peer-to-peer system maintaining an access point table comprising a list of data objects stored into the peer-to-peer system, wherein each data object is associated with a peer entity of the peer-to-peer system that stores the data object,
   wherein, when the peer entity does not locally store the data object, the peer entity accessing its access point table to check if there is information on a peer entity of the peer-to- peer system that stores the data object and, if so, sending the request for the update to such peer entity.

13. A peer-to-peer system comprising a plurality of peer entities wherein each peer entity comprises modules that, at receipt of a request for storing a data object into the peer-to-peer system, perform steps comprising:
   forming a group of peer entities of the peer-to-peer system so that the group meets a stability requirement according to predetermined stability rules, and
   sending instructions to each peer entity of the group to store the data object, wherein
- said instructions comprise information on the peer entities forming the group, and in that
- each peer entity of the peer-to-peer system also comprises modules that, at receipt of said instructions, are adapted to store the data object and to generate and hold a group list, associated with said data object, with the peer entities comprised in the received instructions, wherein the peer entities of the formed group, elect a primary peer entity of the group, according to a common selection criterion, to periodically check if, according to the predetermined stability rules, the stability requirement of the group is maintained, and if, the stability requirement of the group is not met during the periodically checking, the primary peer entity changing the composition of the group by adding or removing peer entities to cause the group to meet the stability requirement and informing all the peer entities of the group to update their group list associated with the data object.

\* \* \* \* \*